US011187811B2

(12) United States Patent
Krantz et al.

(10) Patent No.: US 11,187,811 B2
(45) Date of Patent: Nov. 30, 2021

(54) GNSS RECEIVER TO ANTENNA COMMUNICATIONS

(71) Applicant: Trimble Inc., Sunnyvale, CA (US)

(72) Inventors: Eric Krantz, Emerald Hills, CA (US); Stuart Riley, San Jose, CA (US)

(73) Assignee: Trimble Inc., Sunnyvale, CA (US)

( * ) Notice: Subject to any disclaimer, the term of this patent is extended or adjusted under 35 U.S.C. 154(b) by 312 days.

(21) Appl. No.: 15/880,912

(22) Filed: Jan. 26, 2018

(65) Prior Publication Data

US 2019/0235089 A1   Aug. 1, 2019

(51) Int. Cl.
| | | |
|---|---|---|
| *G01S 19/36* | (2010.01) | |
| *H04B 1/18* | (2006.01) | |
| *G01S 19/13* | (2010.01) | |
| *G01S 19/35* | (2010.01) | |

(52) U.S. Cl.
CPC .............. *G01S 19/36* (2013.01); *G01S 19/13* (2013.01); *G01S 19/35* (2013.01); *H04B 1/18* (2013.01)

(58) Field of Classification Search
CPC .......... G01S 19/35; G01S 19/36; G01S 19/13; H04B 1/3805; H04B 7/0602; H04B 7/0802; H04B 1/0064; H04B 1/18; H04B 7/18513; H04W 64/00; H01Q 1/2208
USPC .......... 455/557, 343.1, 556.1, 556.2
See application file for complete search history.

(56) References Cited

U.S. PATENT DOCUMENTS

| | | | | |
|---|---|---|---|---|
| 5,943,018 A | * | 8/1999 | Miller | H01Q 1/2258 |
| | | | | 343/702 |
| 7,650,173 B2 | * | 1/2010 | Samavati | H01Q 5/40 |
| | | | | 455/575.9 |
| 10,224,979 B1 | * | 3/2019 | Hunter | H04B 3/542 |
| 2002/0021244 A1 | * | 2/2002 | Aizawa | G01S 19/36 |
| | | | | 342/357.76 |

(Continued)

FOREIGN PATENT DOCUMENTS

| | | | |
|---|---|---|---|
| WO | 2008/144921 A1 | 12/2008 | |
| WO | WO-2008148530 A1 * | 12/2008 | ........... H01Q 1/3275 |
| WO | 2017/188836 A1 | 11/2017 | |

OTHER PUBLICATIONS

Extended European Search Report for Application No. 19153493.2 dated Aug. 16, 2019, 8 pages.

*Primary Examiner* — Olumide Ajibade Akonai
(74) *Attorney, Agent, or Firm* — Kilpatrick Townsend & Stockton

(57) ABSTRACT

A global navigation satellite system (GNSS) receiver including an antenna module configured to removably attach to a receiver module. The antenna module includes an antenna configured to receive wireless signals transmitted by a GNSS satellite. The antenna is coupled to a wired connection. The antenna module also includes an antenna-side radio that is coupled to the wired connection. The antenna-side radio is configured to perform actions including sending, via the wired connection, an identifying signal to a receiver-side radio. The identifying signal includes identification information corresponding to the antenna. The receiver module includes the receiver-side radio coupled to the wired connection. The receiver-side radio is configured to perform operations including receiving, via the wired connection, the identifying signal from the antenna-side (Continued)

radio. The receiver module also includes a radio frequency (RF) front end coupled to the wired connection.

18 Claims, 10 Drawing Sheets

(56) References Cited

U.S. PATENT DOCUMENTS

| | | | | |
|---|---|---|---|---|
| 2003/0045326 A1* | 3/2003 | Bailey | .................... | H04H 20/71 |
| | | | | 455/557 |
| 2003/0146868 A1* | 8/2003 | Yamazaki | ............... | G01S 19/34 |
| | | | | 342/357.76 |
| 2004/0116084 A1* | 6/2004 | Ward | .................... | H01Q 23/00 |
| | | | | 455/130 |
| 2004/0142676 A1* | 7/2004 | Sim | ........................ | H04B 1/207 |
| | | | | 455/351 |
| 2004/0161967 A1* | 8/2004 | Tsai | ........................ | G01S 19/35 |
| | | | | 439/502 |
| 2005/0242991 A1 | 11/2005 | Montgomery et al. | | |
| 2009/0066479 A1* | 3/2009 | Chen | .................... | H01Q 1/2208 |
| | | | | 340/10.1 |
| 2009/0190041 A1* | 7/2009 | Narita | ............... | H04N 21/44209 |
| | | | | 348/730 |
| 2010/0134351 A1* | 6/2010 | Yang | ........................ | G01S 19/11 |
| | | | | 342/357.48 |
| 2011/0068974 A1* | 3/2011 | Reese | .................... | G01S 19/35 |
| | | | | 342/357.4 |
| 2011/0243274 A1 | 10/2011 | Kelin et al. | | |
| 2012/0169537 A1* | 7/2012 | Danilenko | ............... | G01S 19/34 |
| | | | | 342/357.63 |
| 2016/0285491 A1* | 9/2016 | Camello | ............... | H04B 1/3822 |
| 2017/0261619 A1* | 9/2017 | Klein | ..................... | G01S 19/36 |
| 2018/0034136 A1* | 2/2018 | Erentok | ................... | H01Q 1/48 |
| 2018/0063463 A1* | 3/2018 | Kim | ........................ | H04N 5/50 |
| 2018/0217270 A1* | 8/2018 | Vasilyuk | ................ | G01C 17/02 |
| 2018/0341024 A1* | 11/2018 | Shetty | .................... | G01S 19/37 |

* cited by examiner

GNSS RECEIVER TO ANTENNA COMMUNICATIONS

BACKGROUND

Global navigation satellite systems (GNSS) use wireless signals that are transmitted from medium Earth orbit (MEO) satellites to GNSS receivers to determine position and velocity information for the GNSS receivers. Examples of currently operational GNSSs include the United States' Global Positioning System (GPS), the Russian Global Navigation Satellite System (GLONASS), the Chinese BeiDou Satellite Navigation System, and the European Union's (EU) Galileo. Today, GNSS receivers are used in a wide range of applications, including navigation (e.g., for automobiles, planes, boats, persons, animals, freight, military precision-guided munitions, etc.), surveying, mapping, and time referencing. Further applications for GNSS technology will become available as new techniques for improving GNSS accuracy are introduced.

Many GNSS receivers use an external antenna connected via a coaxial cable to receive satellite signals. The external antenna may be periodically replaced or upgraded, often with different antenna models than the originally used antenna. In order to generate position estimates to millimeter accuracy, knowledge of an antenna's phase center along with the precise location and elevation dependence of the antenna phase center may be necessary. Accordingly, if the phase center of the antenna is unknown to the GNSS receiver, the accuracy of any position estimate may be significantly limited. A user may often input a phase center based on visual inspection of the antenna or based on the user's best estimate. This process is error prone and may lead to erroneous position estimates, particularly if the user is mistaken as to the antenna model. Accordingly, there is a need in the art for improved methods and systems related to GNSS technology.

SUMMARY

In a first aspect of the present disclosure, a global navigation satellite system (GNSS) receiver is provided. The GNSS receiver may include an antenna module. The antenna module may include an antenna configured to receive wireless signals transmitted by a GNSS satellite. In some embodiments, the antenna is coupled to a wired connection. The antenna module may also include an antenna-side radio coupled to the wired connection. In some embodiments, the antenna-side radio is configured to perform actions including sending, via the wired connection, an identifying signal to a receiver-side radio. In some embodiments, the identifying signal includes identification information corresponding to the antenna. The GNSS receiver may also include a receiver module. The receiver module may include the receiver-side radio coupled to the wired connection. In some embodiments, the receiver-side radio is configured to perform operations including receiving, via the wired connection, the identifying signal from the antenna-side radio. The receiver module may also include a radio frequency (RF) front end coupled to the wired connection and configured to generate a plurality of samples related to the wireless signals. In some embodiments, the antenna module is configured to removably attach to the receiver module.

In some embodiments, the identification information includes one or more of: an antenna type, an antenna model number, an antenna serial number, a phase center model of the antenna, and a reference point of the antenna. In some embodiments, the operations further include determining, based on the identifying signal, the identification information, and in response to receiving the identifying signal, sending, via the wired connection, a confirmation signal indicating receipt of the identifying signal by the receiver-side radio. In some embodiments, the receiver module further includes a user input device configured to be activated by a user. In some embodiments, the receiver module is configured to receive, via the user input device, an input signal indicating that the antenna module is removably attached to the receiver module. In some embodiments, the receiver module is configured to send, via the wired connection, a power signal to the antenna-side radio. In some embodiments, the power signal provides a direct current (DC) voltage to the antenna-side radio.

in some embodiments, the actions further include receiving, via the wired connection, the power signal from the receiver module. In some embodiments, the identifying signal is sent by the antenna-side radio in response to receipt of the power signal. In some embodiments, the operations further include causing a modification of one or more parameters within the RF front end or a receiver processor based on the identification information. In some embodiments, the receiver processor generates GNSS position data based on the digital samples. In some embodiments, the receiver module includes the receiver processor. In some embodiments, the antenna module further comprises at least one sensor configured to record sensor data including one or more of a temperature of the antenna, a movement of the antenna, and an atmospheric pressure. In some embodiments, the identification information includes the sensor data.

In a second aspect of the present disclosure, an antenna module of a GNSS receiver is provided. In some embodiments, the antenna module may be similar to the antenna module described in reference to the first aspect of the present disclosure.

In a third aspect of the present disclosure, a method is provided. The method may include sending, by an antenna-side radio of an antenna module of a global navigation satellite system, an identifying signal to a receiver-side radio of a receiver module of the GNSS system via a wired connection. The method may also include receiving, by the receiver-side radio via the wired connection, the identifying signal from the antenna-side radio. The method may further include determining, by the receiver-side radio, the identification information based on the identifying signal and, in response to receiving the identifying signal, sending, by the receiver-side radio via the wired connection, a confirmation signal indicating receipt of the identifying signal by the receiver-side radio. In some embodiments, the method includes receiving, by the receiver module via a user input device, an input signal indicating that the antenna module is removably attached to the receiver module. The method may further include steps described in reference to the first aspect of the present disclosure.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

Figure 1:
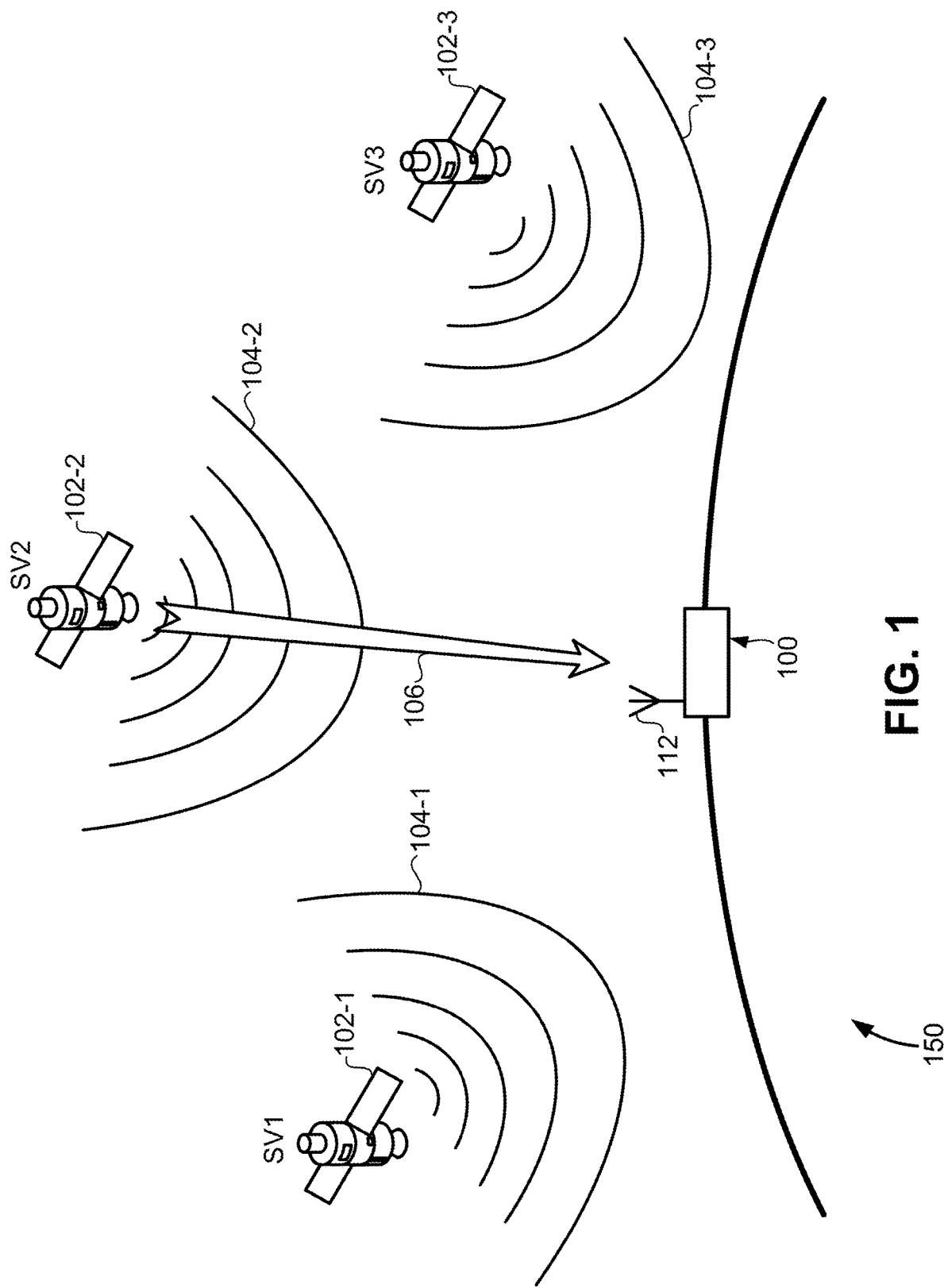
FIG. 1 illustrates a global navigation satellite system (GNSS), according to an embodiment of the present disclosure.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION

Embodiments of the present disclosure provide systems and methods for global navigation satellite system (GNSS) receiver to antenna communications. Specifically, embodiments of the present disclosure include a GNSS receiver having a module-to-module wired communication capability in which an antenna module having a first radio may be attached to a receiver module having a second radio. The two radios utilize a wired connection (e.g., a coaxial cable) formed between the two modules by placing one or more communication signals on top of the GNSS signals received by the antenna. This is accomplished by modulating information onto a carrier frequency and multiplexing the modulated information onto a coaxial cable already in use for the GNSS signals. The carrier frequency of the communication signals may be higher or lower in frequency than the GNSS signals. Since the communication channel between the two radios is a direct wired connection, the signal level of the radios can be very small, thus reducing the likelihood of interference even further. The coaxial cable may also be employed to send direct current (DC) voltage from the receiver module to the antenna-side radio in the antenna module. Accordingly, the wired connection between the antenna module and the receiver module may allow transmission of information/power at three different frequency regimes to facilitate the module-to-module communication capability.

The communication signals between the antenna-side radio and the receiver-side radio may indicate identification information corresponding to the antenna utilized by the GNSS receiver. By analyzing the identification information, the GNSS receiver may determine a phase center model of the antenna, along with other information that may be used to adjust the processing of the GNSS signals to improve the GNSS receiver's accuracy. The two radios have enough memory to store an antenna type, an antenna serial number, a phase center model of the antenna, as well as enough bandwidth to support communications regarding sensor data. The sensor data may include antenna temperature (e.g., using a thermometer), antenna movement and inertia (e.g., using an inertial measurement unit (IMU)), atmospheric pressure (e.g., using a barometer), and the like. Sensors may be placed within or near the antenna module and/or the antenna, and may communicate with the antenna-side radio through wired or wireless communication.

FIG. 1 illustrates a GNSS 150, according to an embodiment of the present disclosure. GNSS 150 includes one or more GNSS satellites 102, i.e., space vehicles (SV), in orbit above a GNSS receiver 100. GNSS satellites 102 continuously, periodically, or intermittently broadcast wireless signals 104 containing PRN codes modulated onto carrier frequencies (e.g., L1 and/or L2 carrier frequencies). Broadcasted wireless signals 104 include both direct wireless signals 106, i.e., signals transmitted and received without reflection off objects, and reflected wireless signals, i.e., signals received by GNSS receiver 100 after reflection off at least one object. Direct wireless signals 106 and reflected wireless signals are received by an antenna 112 positioned within, on, or near GNSS receiver 100, which may be a geodetic antenna, a rover antenna, or a handheld receiver antenna, among other possibilities. Wireless signals 104 corresponding to different GNSS satellites 102 may include different PRN codes that identify a particular GNSS satellite 102 such that GNSS receiver 100 may associate different distance estimates to different GNSS satellites 102. For example, GNSS satellite 102-1 broadcasts wireless signals 104-1 which contain a different PRN code than the PRN code contained in wireless signals 104-2 broadcasted by GNSS satellite 102-2. Similarly, GNSS satellite 102-3 broadcasts wireless signals 104-3 which contain a different PRN code than the PRN codes contained in wireless signals 104-1 and 104-2 broadcasted by GNSS satellites 102-1 and 102-2, respectively.

Merely by way of example, GNSS receiver 100 may use the three distance estimates between itself and GNSS satellites 102-1, 102-2, and 102-3 to generate a position estimate through a process called trilateration. In some instances, trilateration involves generating three spheres having center locations corresponding to the locations of the GNSS satellites 102 and radii corresponding to the distance estimates. The three spheres intersect at two locations, one of which is more plausible than the other given the position of the earth. The less plausible location is disregarded and the more plausible location is used as the position estimate for GNSS receiver 100. The position estimate may be continuously, periodically, or intermittently updated by generating new distance estimates and performing trilateration using the new distance estimates. Subsequent position estimates may benefit from previous position estimates through filtering processes (e.g., Kalman filtering) capable of improving position estimate accuracy. Position estimates may also be determined using other techniques. In practice, a fourth satellite may be observed to estimate the receiver clock error with respect to the satellite system time.

Figure 2:
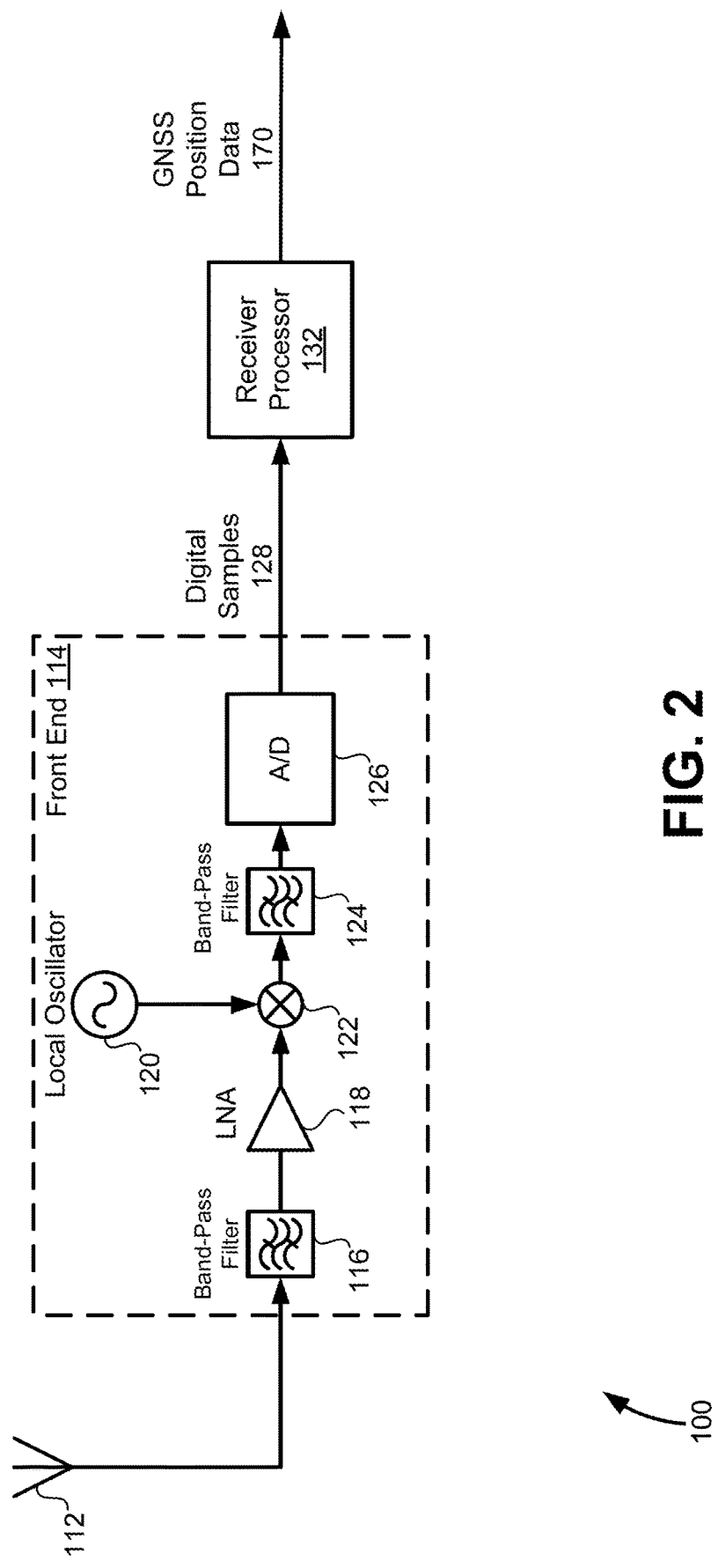
FIG. 2 illustrates a block diagram of a GNSS receiver, according to an embodiment of the present disclosure.

FIG. 2 illustrates a block diagram of GNSS receiver 100, according to an embodiment of the present disclosure. One or more components of GNSS receiver 100 as described in reference to FIG. 2 may correspond to conventional techniques. In some embodiments, GNSS receiver 100 includes antenna 112 for receiving wireless signals 104 and sending/routing a signal related to wireless signals 104 to an RF front end 114. Antenna 112 may be linearly or circularly polarized, may be mounted or embedded, may be a single antenna or an array antenna, may have a narrow or wide bandwidth, among other possibilities. RF front ends are well known in the art, and in some instances include a band-pass filter 116 for initially filtering out undesirable frequency components outside the frequencies of interest, a low-noise amplifier (LNA) 118 for amplifying the received signal, a local oscillator 120 and a mixer 122 for down converting the received signal from RF to intermediate frequencies (IF), a band-pass filter 124 for removing frequency components outside IF, and an analog-to-digital (A/D) converter 126 for sampling the received signal to generate digital samples 128.

In some instances, RF front end 114 includes additional or fewer components than that shown in FIG. 2. For example, RF front end 114 may include a second local oscillator (90 degrees out of phase with respect to local oscillator 120), a second mixer, a second band-pass filter, and a second A/D converter for generating digital samples corresponding to the quadrature component of wireless signals 104. Digital samples corresponding to the in-phase component of wireless signals 104 and digital samples corresponding to the quadrature component of wireless signals 104 may both be sent to receiver processor 132. In some embodiments, digital samples corresponding to both in-phase and quadrature components may be included in digital samples 128. In some embodiments, receiver processor 132 may include one or more correlators.

Other components within RF front end 114 may include a phase-locked loop (PLL) for synchronizing the phase of local oscillator 120 with the phase of the received signal, and a phase shifter for generating a second mixing signal using local oscillator 120 that is 90 degrees out of phase with local oscillator 120. In some embodiments, RF front end 114 does not include band-pass filter 116 and LNA 118. In some embodiments, A/D converter 126 is coupled directly to antenna 112 and samples the RF signal directly without down-conversion to IF. In some embodiments, RF front end 114 only includes band-pass filter 116 and A/D converter 126. Other possible configurations of RF front end 114 are possible.

Digital samples 128 generated by RF front end 114 are sent to receiver processor 132. In some embodiments, receiver processor 132 performs one or more correlations on digital samples 128 using local codes to generate distance estimates between GNSS receiver 100 and GNSS satellites 102. In some embodiments, one or more components of receiver processor 132 (such as, for example, one or more correlators) include specific pieces of hardware, such as an application-specific integrated circuit (ASIC) or a field-programmable gate array (FPGA). In some embodiments, operations performed by receiver processor 132 are performed entirely in software using digital signal processing (DSP) techniques. After generating the distance estimates, receiver processor 132 may perform trilateration to generate a position estimate for GNSS receiver 100. After generating at least one position estimate, receiver processor 132 may output GNSS position data 170 comprising a plurality of GNSS points (i.e., position estimates). Each of the plurality of GNSS points may be a 3D coordinate represented by three real numbers. In some embodiments, the three numbers may correspond to latitude, longitude, and elevation. In other embodiments, the three numbers may correspond to X, Y, and Z positions. GNSS position data 170 may be outputted to be displayed to a user, transmitted to a separate device (e.g., computer, smartphone, server, etc.) via a wired or wireless connection, or further processed, among other possibilities.

Figure 3:
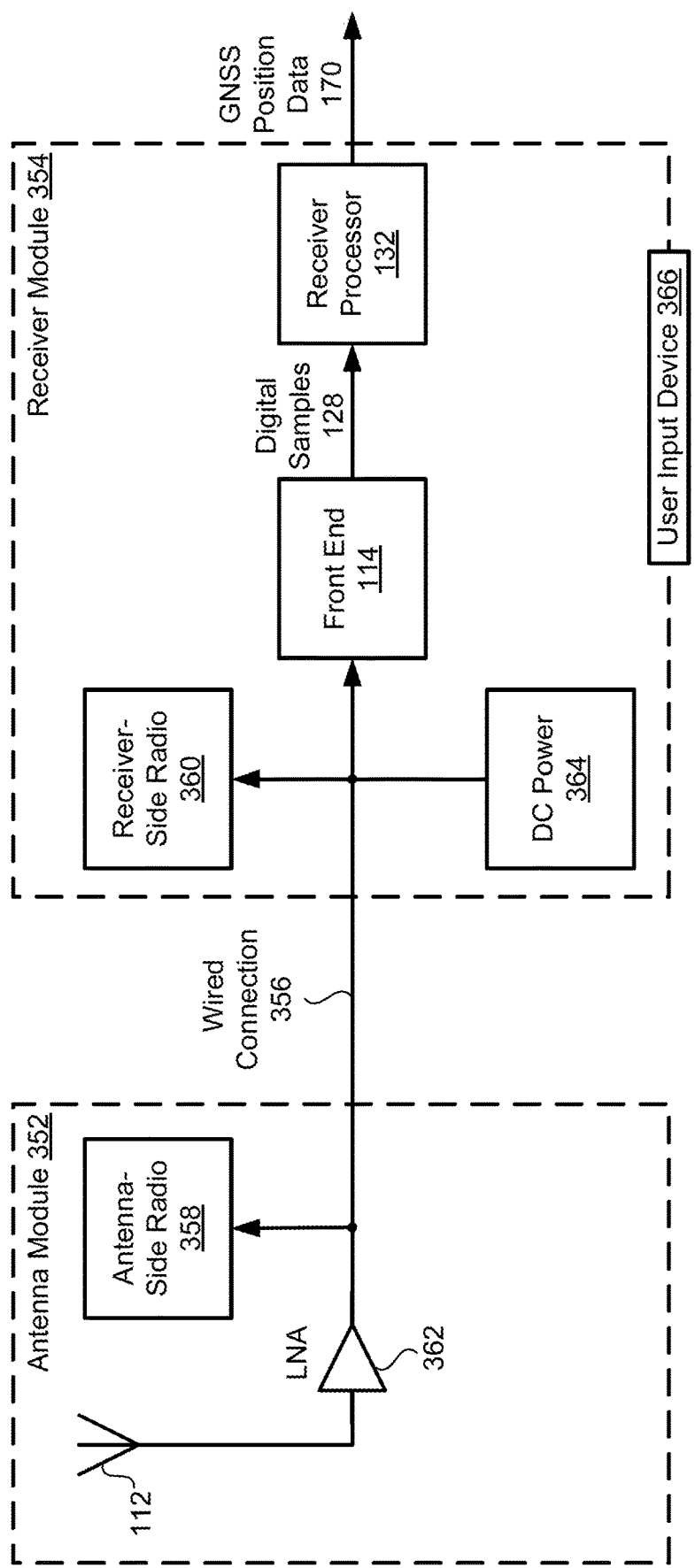
FIG. 3 illustrates a block diagram of a GNSS receiver, according to an embodiment of the present disclosure.

FIG. 3 illustrates a block diagram of a GNSS receiver 300, according to an embodiment of the present disclosure. One or more components of GNSS receiver 300 may correspond to one or more components of GNSS receiver 100, such as, but not limited to, antenna 112, front end 114, digital samples 128, receiver processor 132, and GNSS position data 170.

In some embodiments, GNSS receiver 300 comprises a multiple module configuration in which an antenna module 352 may be removably attached to a receiver module 354. As described herein, the term "removably attached" may refer to any means of attachment that may allow later separation of the modules and/or any means of attachment that is non-permanent. For example, antenna module 352 may be screwed into receiver module 354, fastened to receiver module 354 using screws, bolts, nails, or a snap-fit connection, glued to receiver module 354, secured to receiver module 354 using a cord, suction, or magnets, and the like. In some embodiments, antenna module 352 may be inserted into a cavity or a receiving portion of receiver module 354, or vice-versa.

In some embodiments, attachment of antenna module 352 to receiver module 354 provides/creates a wired connection 356 between at least one component of antenna module 352 and at least one component of receiver module 354. Wired connection 356 may comprise a single conductor or multiple conductors, and may allow bi-directional communication between antenna module 352 and receiver module 354. In one particular implementation, wired connection 356 comprises a coaxial connection (i.e., using a coaxial cable) comprising a copper core, an inner dielectric insulator, a woven copper shield, and an outer plastic sheath. The coaxial connection may further include a female-type coaxial connector and a corresponding male-type coaxial connector. In some embodiments, wired connection 356 is created upon attaching antenna module 352 to receiver module 354 such that wired connection 356 constitutes part of the means of attachment. In some embodiments, wired connection 356 is created after or before attaching antenna module 352 to receiver module 354 such that wired connection 356 is physically separate from the means of attachment. In one particular implementation, antenna module 352 may be secured to a top end of a surveying pole, receiver module 354 may be secured at a distance along the surveying pole, and wired connection 356 may include a coaxial connection between the two running either internally in the surveying pole or along the outside thereof.

In some embodiments, GNSS receiver 300 includes an antenna-side radio 358 within antenna module 352 that communicates with a receiver-side radio 360 within receiver module 354. The communication may be one way (e.g., antenna-side radio 358 only transmits and receiver-side radio 360 only receives) or bi-directional, based on a particular implementation. In some embodiments, antenna-side radio 358 sends identification information corresponding to antenna 112 to receiver-side radio 360 such that receiver-side radio 360 may cause a modification to one or more parameters within front end 114 and/or receiver processor 132 based on the identification information. For example, the identification information may include the phase center model of antenna 112 which describes the location of the phase center of antenna 112 relative to a physical point (i.e., reference point) on antenna 112 that can be measured. The phase center model may describe the location of the phase center in terms of a vertical offset (from the physical point) and in terms of a horizontal offset (from the physical point). The phase center model may further describe how the vertical offset varies as a function of the angle of arrival in elevation of the GNSS signal and how the horizontal offset varies as a function of the angle of arrival in azimuth of the GNSS signal. Additionally, the phase center model may describe how both the vertical offset and the horizontal offset vary as a function of the frequency of the GNSS signal.

In some instances, knowledge of the precise angle of arrival dependence (relative to the physical housing) and frequency dependence of the phase center of antenna 112 is necessary to compute a position estimate of GNSS receiver 300 (or the physical point being measured) to millimeter accuracy. The phase center characteristics information may be measured or determined upon manufacture of antenna 112 and may be written onto one or more storage devices within antenna-side radio 358 and later sent from antenna-side radio 358 to receiver-side radio 360 via wired connection 356. The identification information may be utilized by one or both of front end 114 and receiver processor 132 such that GNSS position data 170 more accurately reflects the actual position of GNSS receiver 300 (or the physical point being measured) than otherwise would be estimated if the identification information were unknown to GNSS receiver 300.

In some embodiments, communication between antenna module 352 and receiver module 354 is performed by modulating information onto a carrier frequency and multiplexing the modulated information onto wired connection 356 (or a conductor coupled to wired connection 356) such that the modulated information is transmitted via wired connection 356 to the radio that is receiving the information. For example, antenna-side radio 358 may modulate identification information (including, e.g., the phase center model of antenna 112) onto a carrier frequency (e.g., a 868 MHz sinusoidal signal) and may send the modulated information to receiver-side radio 360 via wired connection 356. Accordingly, each of antenna-side radio 358 and receiver-side radio 360 may include various components necessary for wired and/or wireless communication, such as local oscillators, band-pass filters, LNAs, mixers, A/D converters, and the like.

In some embodiments, antenna module 352 includes an LNA 362 for amplifying the GNSS signal received by antenna 112. LNA 362 may improve the performance of GNSS receiver 300 by setting the system noise figure at antenna 112 and preventing degradation of the signal-to-noise ratio (SNR) of the received GNSS signal in the subsequent signal processing. The importance of including LNA 362 in GNSS receiver 300 may be significant in implementations in which wired connection 356 is longer than certain distances (e.g., 1 foot). In some instances, amplifying the received GNSS signal may improve communication between antenna-side radio 358 and receiver-side radio 360 by allowing the radios to increase transmitted signal strength without concern for interference with the received GNSS signal.

In some embodiments, receiver module 354 includes a DC power 364. In various embodiments, DC power 364 may be a DC voltage source or a pathway to an external DC voltage source. For example, DC power 364 may be a battery, a conversion mechanism for converting alternating-current (AC) voltage to DC voltage, a photodiode, a conductive pathway to an external DC voltage source, or some other means of providing DC voltage. DC power 364 may be coupled to wired connection 356 (or a conductor coupled to wired connection 356) such that DC voltage may be provided to one or more components of antenna module 352.

In some embodiments, receiver module 354 includes a user input device 366 that may be activated by a user. In some embodiments, user input device 366 may include a button or switch capable of being pressed or flipped by a user to indicate that antenna module 352 has been attached to receiver module 354. Other means of physical activation are contemplated. In some embodiments, user input device 366 may be wirelessly activated by a user by, for example, the user indicating on an external device (e.g., a smart phone) that antenna module 352 has been attached to receiver module 354. In some embodiments, activation of user input device 366 may cause user input device 366 to generate an input signal that is sent to one or more components of GNSS receiver 300.

Figure 4:
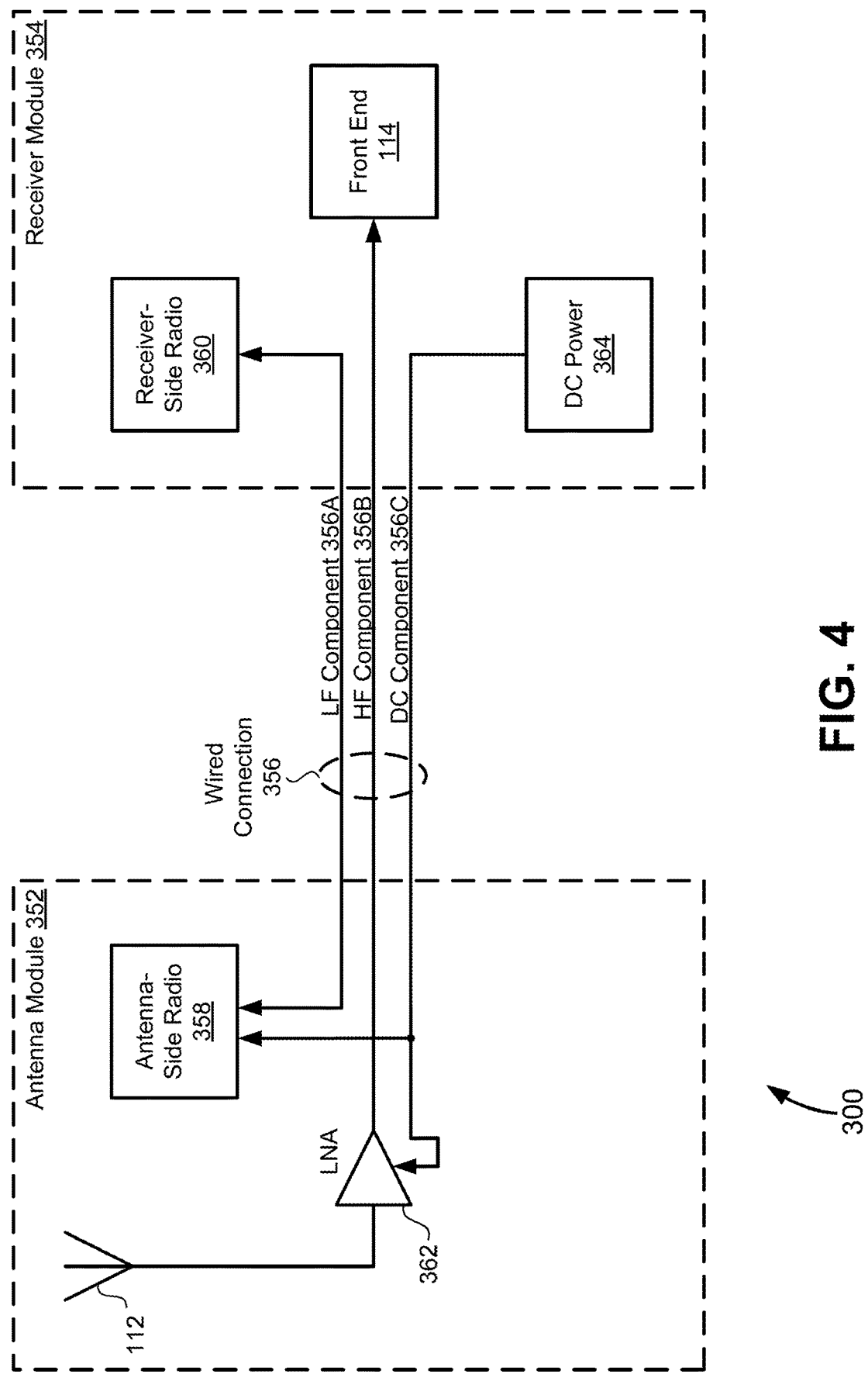
FIG. 4 illustrates a block diagram of a GNSS receiver, according to an embodiment of the present disclosure.

FIG. 4 illustrates a block diagram of GNSS receiver 300, according to an embodiment of the present disclosure. In some embodiments, wired connection 356 may be represented as having three separate components through which separate signals on separate frequencies may be transmitted, namely, a low-frequency (LF) component 356A, a high-frequency (HF) component 356B, and a DC component 356C. In some embodiments, antenna-side radio 358 may be configured so as to transmit and receive on LF component 356A and to receive on DC component 356C. In some embodiments, receiver-side radio 360 may be configured so as to transmit and receive on LF component 356A. In some embodiments, LNA 362 may be configured so as to receive on DC component 356C. In some embodiments, DC power 364 may be configured so as to transmit on DC component 356C. Although various implementations may be utilized, in one particular implementation LF component 356A may include signals having a carrier frequency of 868 MHz and HF component 356B may include lowband GNSS signals having a carrier frequency between 1166 MHz and 1300 MHz and highband GNSS signals having a carrier frequency between 1525 MHz and 1610 MHz. For a given implementation, it may be important to select LF component 356A far enough away from HF component 356B such that the signals operating within the different components do not interfere.

Figure 5:
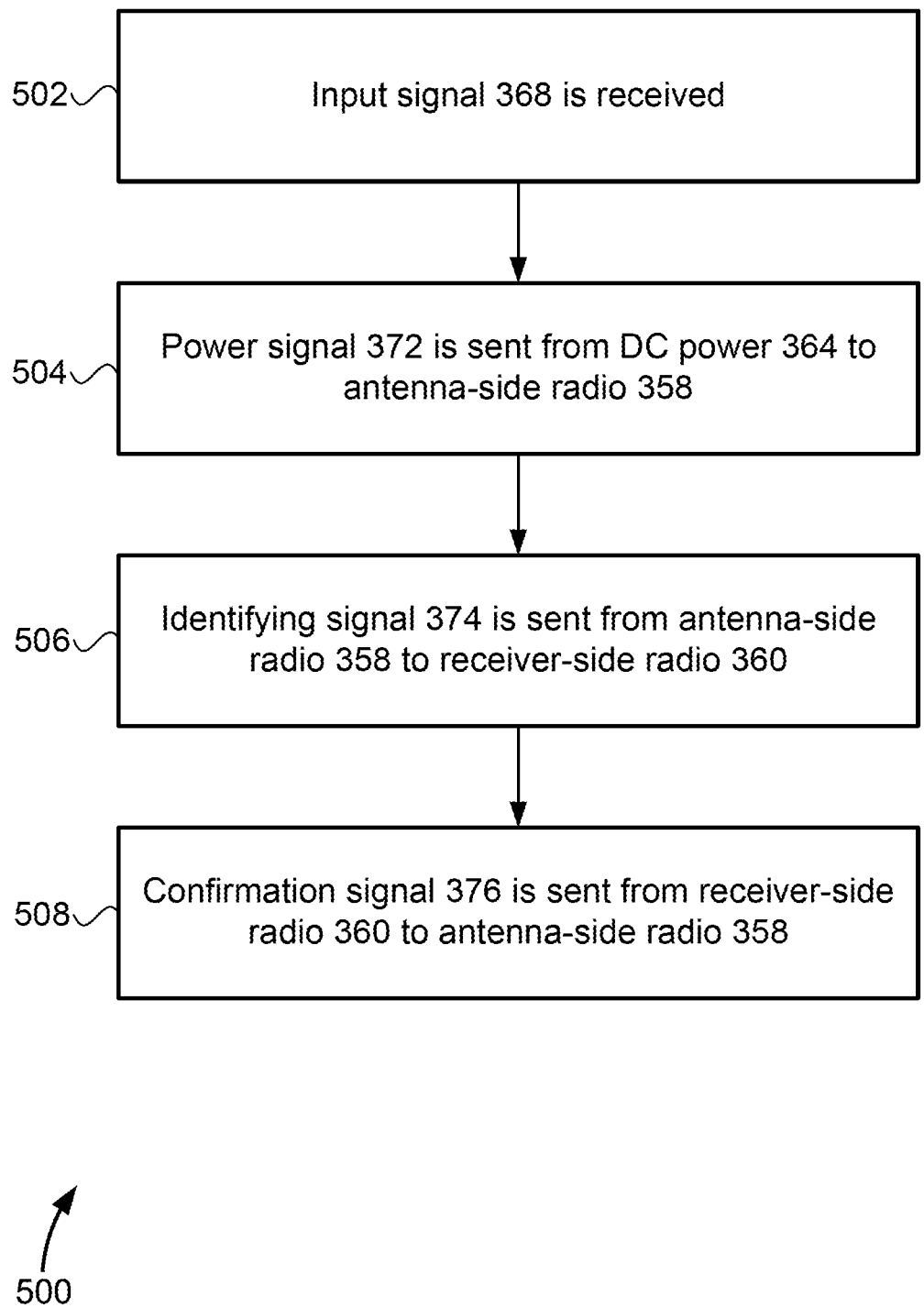
FIG. 5 illustrates a method for calibrating a GNSS receiver, according to an embodiment of the present disclosure.

FIG. 5 illustrates a method 500 for calibrating GNSS receiver 300, according to an embodiment of the present disclosure. Performance of method 500 may including performing additional or fewer steps than that shown in FIG. 5. Furthermore, the steps shown need not be performed in the order shown. In some embodiments, one or more steps of method 500 may be performed by or initiated by a single processor. In other embodiments, one or more steps of method 500 are performed at least in part by different components of GNSS receiver 300. Steps of method 500 are described below alongside corresponding drawings of FIGS. 6A-6D.

FIGS. 6A-6D illustrate various steps of method 500 for calibrating GNSS receiver 300, according to an embodiment of the present disclosure. In reference to FIGS. 5 and 6A, an input signal 368 is received at step 502. Input signal 368 may indicate that antenna module 352 has been attached to receiver module 354 and/or that a user is ready to operate GNSS receiver 300. In the specific implementation shown in FIG. 6A, input signal 368 is received by receiver module 354 via user input device 366. In other embodiments, user input device 366 may be included in antenna module 352 and input signal 368 may be sent via wired connection 356 to one or more components of receiver module 354. In some embodiments, input signal 368 may be generated by user input device 366 upon activation of user input device 366 by a user. For example, input signal 368 may be generated upon a user pressing a button or flipping a switch or, in some embodiments, user input device 366 may be wirelessly activated by a user using an external device.

In some embodiments, input signal 368 may be received by receiver module 354 via automatic generation of input signal 368 in response to detecting that antenna module 352 has been attached to receiver module 354. For example, GNSS receiver 300 may include one or more detectors positioned on one or both of antenna module 352 and receiver module 354 which, upon attachment of antenna module 352 to receiver module 354, generate and send input signal 368 to one or more components of receiver module 354. The detectors may include, for example, one or more buttons positioned along the attaching interface between antenna module 352 and receiver module 354. Alternatively or additionally, the detectors may include one or more touch sensors, proximity sensors, capacitive sensors, and the like.

In some embodiments, input signal 368 is an information-carrying signal. In other embodiments, or in the same embodiments, input signal 368 is a constant DC voltage with a set of possible values indicating whether antenna module 352 is attached to receiver module 354, such as a value of 1.5 V corresponding to attachment and a value of 0 V corresponding to no attachment. In some embodiments, input signal 368 is coupled to a switch 370 such that switch 370 is closed when input signal 368 exceeds a particular threshold and is open when input signal 368 does not exceed the particular threshold. Accordingly, input signal 368 may control the output of one or more components of receiver module 354, such as DC power 364, by opening and closing switch 370.

Figure 6A:
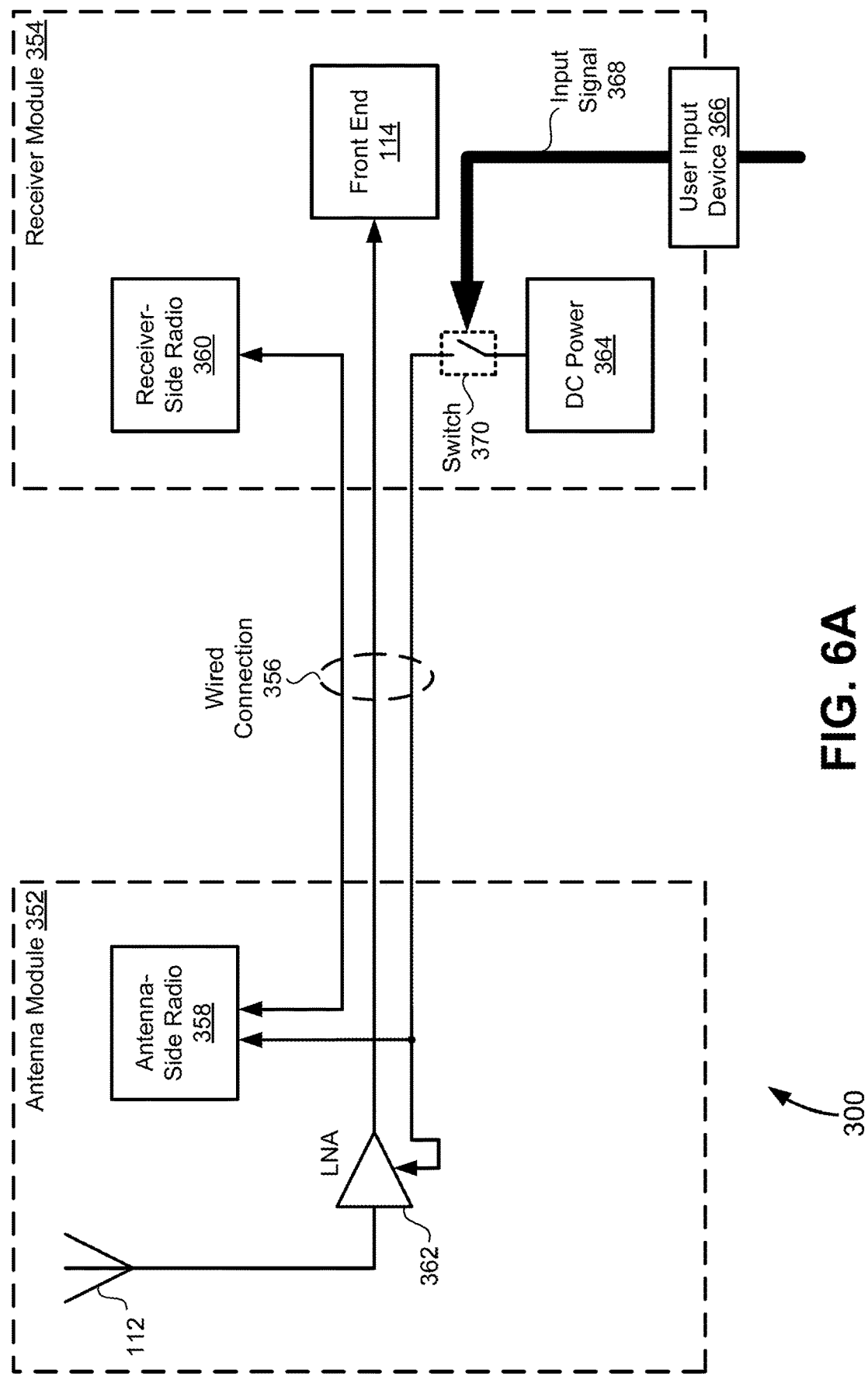
FIGS. 6A-6D illustrate various steps of a method for calibrating a GNSS receiver, according to an embodiment of the present disclosure.
Figure 6B:
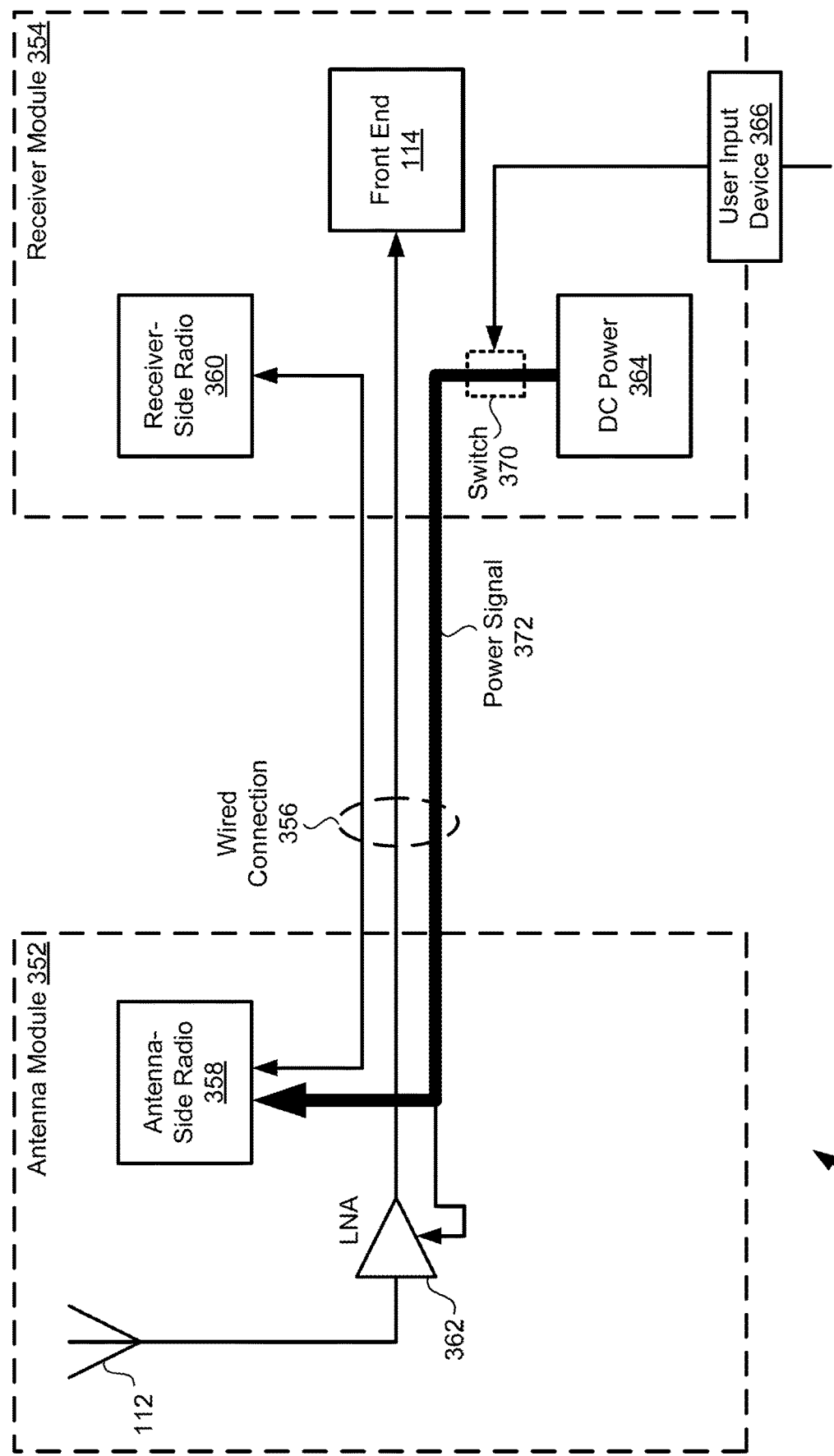

In reference to FIGS. 5 and 6B, a power signal 372 is sent from DC power 364 to antenna-side radio 358 at step 504. Power signal 372 may be sent via wired connection 356, or via a separate wired connection between antenna module 352 and receiver module 354. Power signal 372 may be sent in response to input signal 368 causing switch 370 to close. In other embodiments, or in the same embodiments, input signal 368 may cause DC power 364 to turn on or off, thus saving battery when antenna-side radio 358 is not in use. In some embodiments, power signal 372 is a constant DC voltage, such as 100 mV, 500 mV, 1 V, 5 V, 10 V, or the like. In addition to antenna-side radio 358, power signal 372 may also be sent to LNA 362 and/or receiver-side radio 360.

Figure 6C:
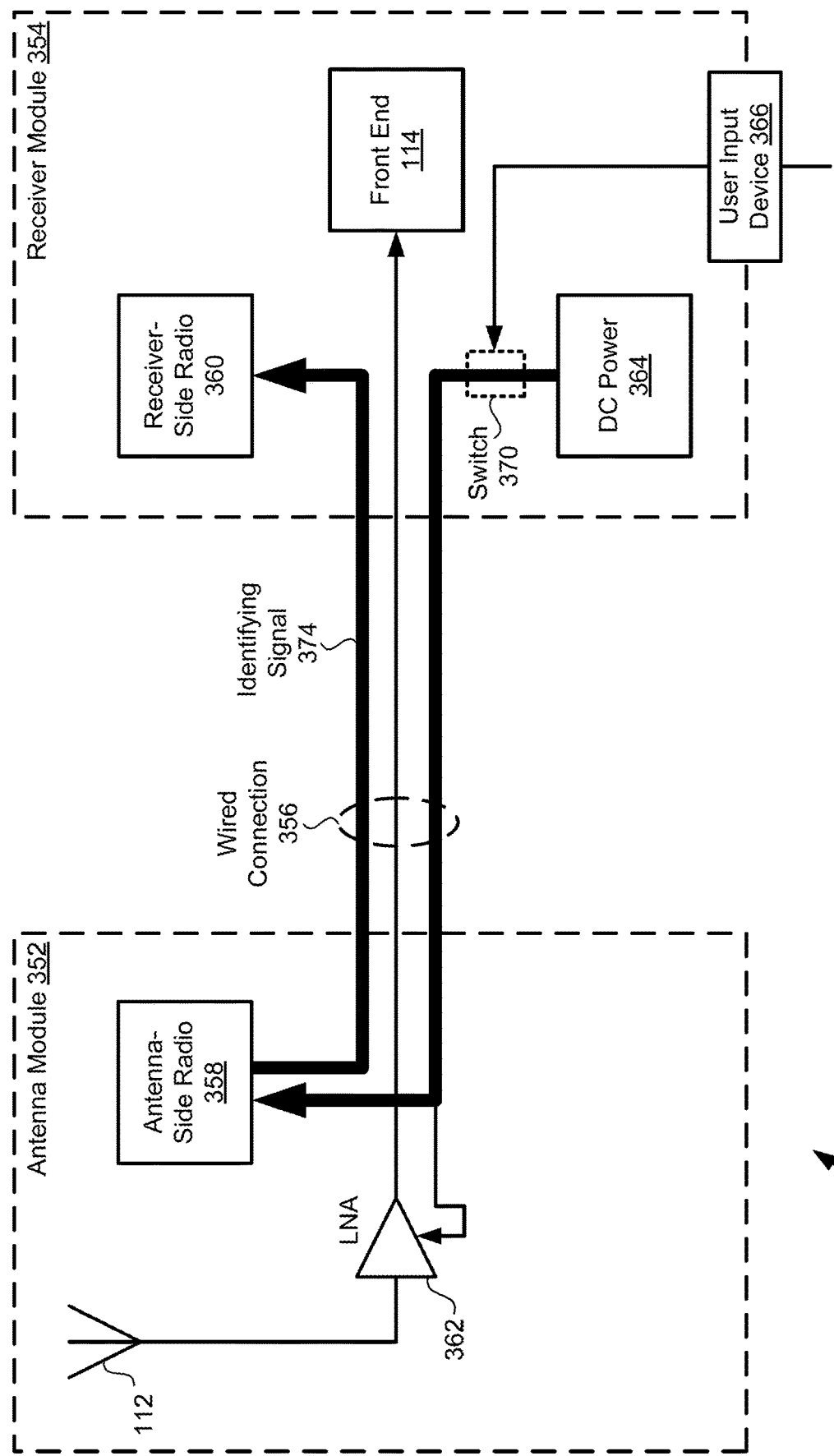

In reference to FIGS. 5 and 6C, an identifying signal 374 is sent from antenna-side radio 358 to receiver-side radio 360 at step 506. Identifying signal 374 may be sent via wired connection 356, or via a separate wired connection between antenna module 352 and receiver module 354. Identifying signal 374 may be sent by antenna-side radio 360 in response to receipt of power signal 372 by antenna-side radio 358. For example, identifying signal 374 may be sent immediately upon receipt of power signal 372 or after a predetermined amount of time from receipt of power signal 372. In some embodiments, antenna-side radio 358 may send identifying signal 374 immediately upon receipt of wireless signals 104 by antenna 112 or after a predetermined amount of time from receipt of wireless signals 104 by antenna 112. In one particular implementation, antenna-side radio 358 may monitor wired connection 356 and/or antenna 112 for the presence of signals having frequency components consistent with GNSS signals. In response to determining the presence of such signals, antenna-side radio 358 may sent identifying signal 374. In another particular implementation, antenna-side radio 358 may monitor wired connection 356 for the presence of signals within a predetermined frequency range (e.g., between 1166 MHz and 1300 MHz) and in response to determining the presence of such signals, determine a specific frequency of the signals (e.g., 1235 MHz) and modify the phase center model based on the specific frequency prior to sending the phase center model to receiver-side radio 360. By pre-modifying the phase center model based on the specific frequency of the received GNSS signals, identifying signal 374 (which contains the phase center model) may include a smaller amount of information and accordingly may be sent on a smaller bandwidth.

In some embodiments, identifying signal 374 includes identification information corresponding to antenna 112. The identification information may allow receiver module 354 to identify antenna 112 and to modify one or more parameters within front end 114 and/or receiver processor 132 based on antenna 112 (i.e., based on the identification information). For example, different antennas have different phase center models which affect the manner in which GNSS signals received by the antennas are processed. By adjusting a parameter within front end 114 and/or receiver processor 132 (e.g., a filtering parameter) based on the identification information, the accuracy of GNSS position data 170 is improved. Specifically, for estimating the position of GNSS receiver 300 to millimeter accuracy, the phase center model of antenna 112 may need to be known.

In some embodiments, the identification information directly includes the phase center model of antenna 112. In other embodiments, or in the same embodiments, the phase center model of antenna 112 can be determined based on other information in the identification information. For example, the identification information may include an antenna type of antenna 112, a model number of antenna 112, a serial number of antenna 112, and the like. In some embodiments, the identification information may include a physical point on antenna 112 from which the phase center can be referenced.

In some embodiments, the identification information includes a library reference number that corresponds to a library accessible to receiver-side radio 360 such that, upon receipt of identifying signal 374, receiver-side radio 360 may access an entry within the library corresponding to the library reference number to determine the phase center model of antenna 112, the antenna type of antenna 112, the model number of antenna 112, the serial number of antenna 112, and the like. The library may be located within receiver-side radio 360 or elsewhere within receiver module 354.

Figure 6D:
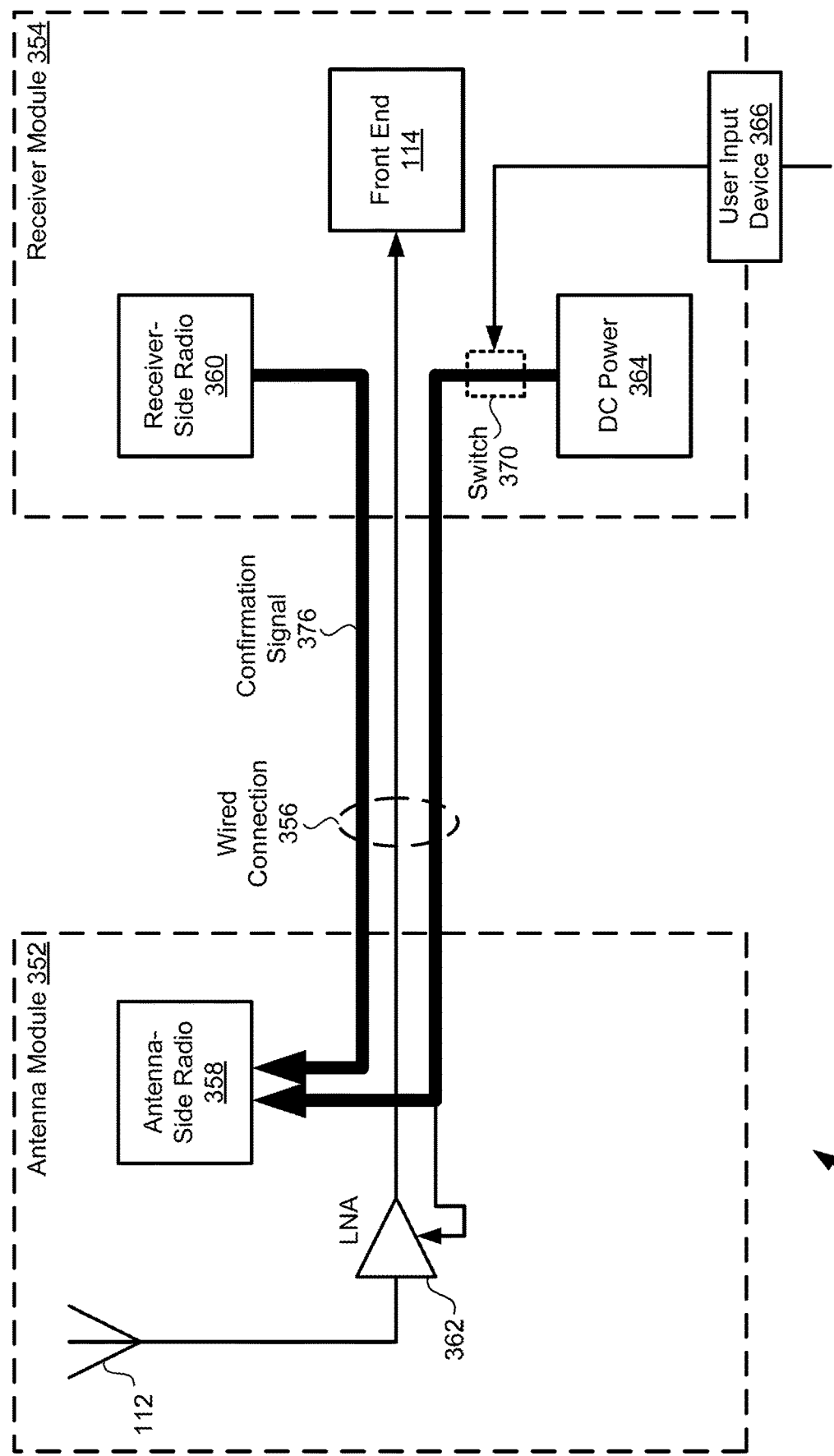

In reference to FIGS. 5 and 6D, a confirmation signal 376 is sent from receiver-side radio 360 to antenna-side radio 358 at step 508. Confirmation signal 376 may indicate successful receipt of identifying signal 374, or may indicate both successful receipt and successful processing of identifying signal 374. For example, confirmation signal 376 may be sent by receiver-side radio 360 upon determining, based on the identification information, the phase center model of antenna 112, the antenna type of antenna 112, the model number of antenna 112, the serial number of antenna 112, and the like. In some embodiments, confirmation signal 376 may include the identification information as received by receiver-side radio 360 so that antenna-side radio 358 may verify that the correct information was received by receiver-side radio 360.

In some embodiments, confirmation signal 376 may cause one or more components within GNSS receiver 300 to turn off. For example, receiver-side radio 360 may turn off upon sending confirmation signal 376 and/or antenna-side radio 358 may turn off upon receiving confirmation signal 376.

Alternatively or additionally, confirmation signal 376 may be sent to DC power 364 causing DC power 364 to turn off, or confirmation signal 376 may be sent to switch 370 causing switch 370 to open. In one particular implementation, DC power 364 continues to provide DC voltage to LNA 362 and both antenna-side radio 358 and receiver-side radio 360 stop drawing power from DC power 364 upon sending and receiving confirmation signal 376, respectively. Accordingly, GNSS receiver 300 may continue to benefit from a powered LNA 362 after the identification information has been processed by receiver module 354.

In some embodiments, receipt of confirmation signal 376 may cause antenna-side radio 358 to collect data from one or more sensors within antenna module 352 and to send the sensor data to receiver-side radio 360. The sensor data may include antenna temperature (e.g., using a thermometer), antenna movement and inertia (e.g., using an IMU), atmospheric pressure (e.g., using a barometer), and the like. Receipt of the sensor data by receiver-side radio 360 may cause receiver module 354 to modify one or more parameters within front end 114 and/or receiver processor 132 based on the sensor data. For example, the phase center model of antenna 112 may be adjusted if it is determined, based on sensor data recorded by an IMU, that antenna 112 has partially moved and/or rotated.

Figure 7:
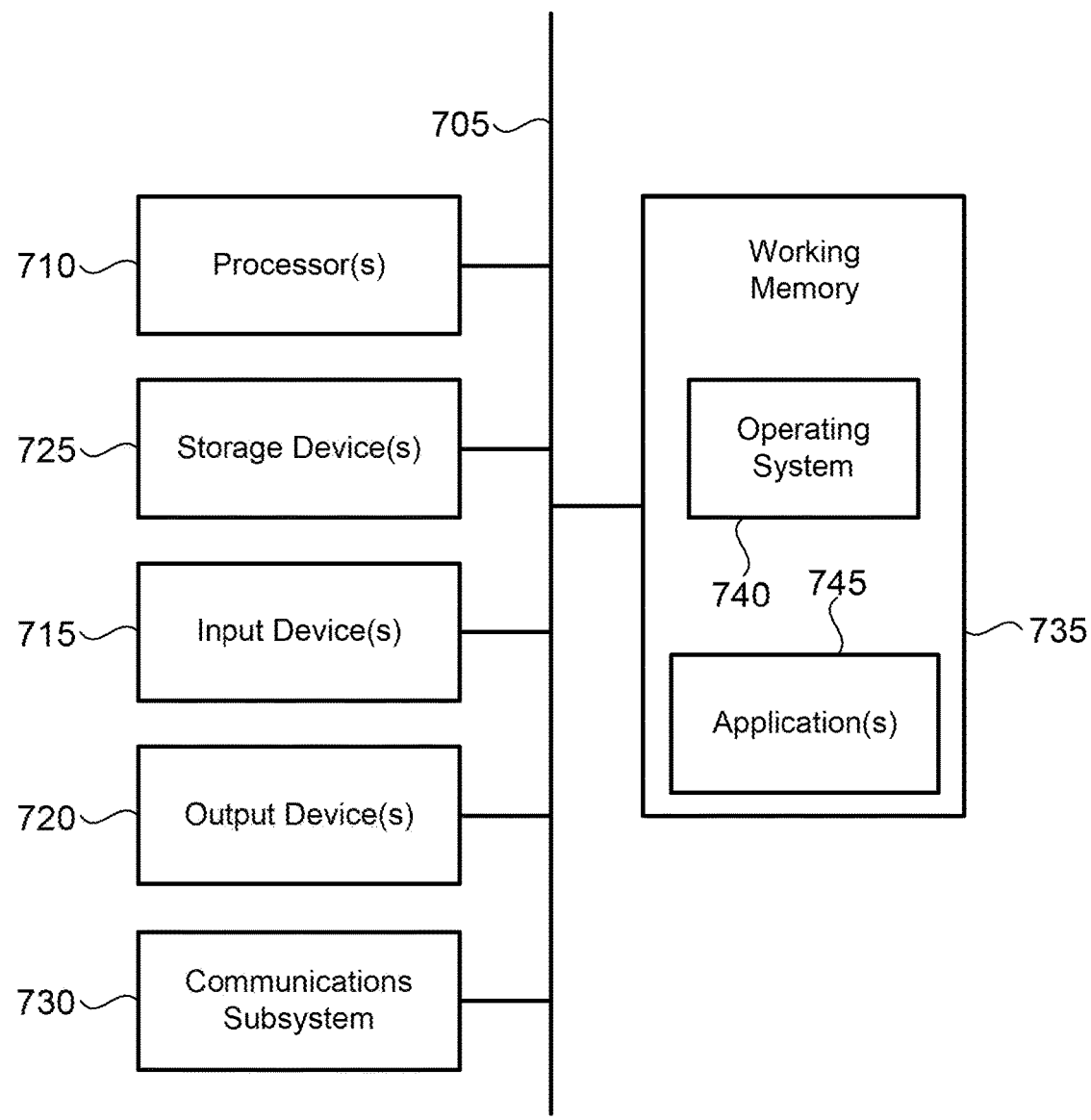
FIG. 7 illustrates a simplified computer system, according to an embodiment of the present disclosure.

FIG. 7 illustrates a simplified computer system 700, according to an embodiment of the present disclosure. A computer system 700 as illustrated in FIG. 7 may be incorporated into devices such as a portable electronic device, mobile phone, or other device as described herein. FIG. 7 provides a schematic illustration of one embodiment of a computer system 700 that can perform some or all of the steps of the methods provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or more integrated manner.

The computer system 700 is shown comprising hardware elements that can be electrically coupled via a bus 705, or may otherwise be in communication, as appropriate. The hardware elements may include one or more processors 710, including without limitation one or more general-purpose processors and/or one or more special-purpose processors such as digital signal processing chips, graphics acceleration processors, and/or the like; one or more input devices 715, which can include, without limitation a mouse, a keyboard, a camera, and/or the like; and one or more output devices 720, which can include, without limitation a display device, a printer, and/or the like.

The computer system 700 may further include and/or be in communication with one or more non-transitory storage devices 725, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 700 might also include a communications subsystem 730, which can include, without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 730 may include one or more input and/or output communication interfaces to permit data to be exchanged with a network such as the network described below to name one example, to other computer systems, and/or any other devices described herein. Depending on the desired functionality and/or other implementation concerns, a portable electronic device or similar device may communicate image and/or other information via the communications subsystem 730. In other embodiments, a portable electronic device, e.g. the first electronic device, may be incorporated into the computer system 700, e.g., an electronic device as an input device 715. In some embodiments, the computer system 700 will further comprise a working memory 735, which can include a RAM or ROM device, as described above.

The computer system 700 also can include software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the methods discussed above can be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 725 described above. In some cases, the storage medium might be incorporated within a computer system, such as computer system 700. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware or software including portable software, such as applets, etc., or both. Further, connection to other computing devices such as network input/output devices may be employed.

As mentioned above, in one aspect, some embodiments may employ a computer system such as the computer system 700 to perform methods in accordance with various embodiments of the technology. According to a set of embodiments, some or all of the procedures of such methods are performed by the computer system 700 in response to processor 710 executing one or more sequences of one or more instructions, which might be incorporated into the operating system 740 and/or other code, such as an application program 745, contained in the working memory 735. Such instructions may be read into the working memory 735 from another computer-readable medium, such as one or more of the storage device(s) 725. Merely by way of example, execution of the sequences of instructions contained in the working memory 735 might cause the processor(s) 710 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 and/or components thereof generally will receive signals, and the bus 705 then might carry the signals and/or the data, instructions, etc. carried by the signals to the working memory 735, from which the processor(s) 710 retrieves and executes the instructions. The instructions received by the working memory 735 may optionally be stored on a non-transitory storage device 725 either before or after execution by the processor(s) 710.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A global navigation satellite system (GNSS) receiver comprising:
   an antenna module comprising:
   an antenna configured to receive wireless signals transmitted by a GNSS satellite, wherein the antenna is coupled to a wired connection; and
   an antenna-side radio coupled to the wired connection, wherein the antenna-side radio is configured to perform actions including:
   sending, via a low-frequency component of the wired connection, an identifying signal to a receiver-side radio, wherein the identifying signal includes identification information corresponding to the antenna; and
   a receiver module configured to provide a direct current (DC) voltage to the antenna-side radio via a DC component of the wired connection for powering the antenna-side radio to send the identifying signal to the receiver-side radio, the DC component being separate from the low-frequency component, the receiver module comprising:
  the receiver-side radio coupled to the wired connection, wherein the receiver-side radio is configured to perform operations including:
    receiving, via the wired connection, the identifying signal from the antenna-side radio; and
    a radio frequency (RF) front end coupled to the wired connection and configured to generate a plurality of samples related to the wireless signals;
  wherein the antenna module is configured to removably attach to the receiver module;
  wherein the antenna-side radio is configured to receive on the DC component and to transmit on the low-frequency component.

2. The GNSS receiver of claim 1, wherein the identification information includes one or more of:
  an antenna type;
  an antenna model number;
  an antenna serial number;
  a phase center model of the antenna; and
  a reference point of the antenna.

3. The GNSS receiver of claim 1, wherein the operations further include:
  determining, based on the identifying signal, the identification information; and
  in response to receiving the identifying signal, sending, via the wired connection, a confirmation signal indicating receipt of the identifying signal by the receiver-side radio.

4. The GNSS receiver of claim 1, wherein the receiver module further comprises a user input device configured to be activated by a user.

5. The GNSS receiver of claim 4, wherein the receiver module is configured to receive, via the user input device, an input signal indicating that the antenna module is removably attached to the receiver module.

6. The GNSS receiver of claim 1, wherein the actions further include:
  receiving, via the wired connection, the DC voltage from the receiver module, wherein the identifying signal is sent by the antenna-side radio in response to receipt of the DC voltage.

7. The GNSS receiver of claim 1, wherein the operations further include:
  causing a modification of one or more parameters within the RF front end or a receiver processor based on the identification information, wherein the receiver processor generates GNSS position data based on the plurality of samples, and wherein the receiver module includes the receiver processor.

8. The GNSS receiver of claim 1, wherein the antenna module further comprises at least one sensor configured to record sensor data including one or more of a temperature of the antenna, a movement of the antenna, and an atmospheric pressure, and wherein the identification information includes the sensor data.

9. An antenna module of a global navigation satellite system (GNSS) receiver, the antenna module comprising:
  an antenna configured to receive wireless signals transmitted by a GNSS satellite, wherein the antenna is coupled to a wired connection; and
  an antenna-side radio coupled to the wired connection, wherein the antenna-side radio is configured to perform actions including:
    sending, via a low-frequency component of the wired connection, an identifying signal to a receiver-side radio, wherein the identifying signal includes identification information corresponding to the antenna;
  wherein the antenna module is configured to removably attach to a receiver module of the GNSS receiver, the receiver module configured to provide a direct current (DC) voltage to the antenna-side radio via a DC component of the wired connection for powering the antenna-side radio to send the identifying signal to the receiver-side radio, the DC component being separate from the low-frequency component, and wherein the receiver module comprises:
    the receiver-side radio coupled to the wired connection, wherein the receiver-side radio is configured to perform operations including:
      receiving, via the wired connection, the identifying signal from the antenna-side radio; and
      a radio frequency (RF) front end coupled to the wired connection and configured to generate a plurality of samples related to the wireless signals;
  wherein the antenna-side radio is configured to receive on the DC component and to transmit on the low-frequency component.

10. The antenna module of claim 9, wherein the identification information includes one or more of:
  an antenna type;
  an antenna model number;
  an antenna serial number;
  a phase center model of the antenna; and
  a reference point of the antenna.

11. The antenna module of claim 9, wherein the operations further include:
  determining, based on the identifying signal, the identification information; and
  in response to receiving the identifying signal, sending, via the wired connection, a confirmation signal indicating receipt of the identifying signal by the receiver-side radio.

12. The antenna module of claim 9, wherein the receiver module further comprises a user input device configured to be activated by a user.

13. The antenna module of claim 12, wherein the receiver module is configured to receive, via the user input device, an input signal indicating that the antenna module is removably attached to the receiver module.

14. The antenna module of claim 9, wherein the actions further include:
  receiving, via the wired connection, the DC voltage from the receiver module, wherein the identifying signal is sent by the antenna-side radio in response to receipt of the DC voltage.

15. The antenna module of claim 9, wherein the operations further include:
  causing a modification of one or more parameters within the RF front end or a receiver processor based on the identification information, wherein the receiver processor generates GNSS position data based on the plurality of samples, and wherein the receiver module includes the receiver processor.

16. A method comprising:
  providing, by a receiver module of a global navigation satellite system (GNSS) receiver, a direct current (DC) voltage via a low-frequency component of a wired connection to an antenna-side radio of an antenna module of the GNSS receiver for powering the antenna-side radio to send an identifying signal to a receiver-side radio;

sending, by the antenna-side radio, the identifying signal to the receiver-side radio of the receiver module via a DC component of the wired connection, the DC component being separate from the low-frequency component, wherein the identifying signal includes identification information corresponding to an antenna of the antenna module, wherein the antenna is configured to receive wireless signals transmitted by a GNSS satellite, and wherein the antenna, the antenna-side radio, and the receiver-side radio are coupled to the wired connection; and receiving, by the receiver-side radio via the wired connection, the identifying signal from the antenna-side radio;

wherein the antenna module is configured to removably attach to the receiver module;

wherein the antenna-side radio is configured to receive on the DC component and to transmit on the low-frequency component.

17. The method of claim 16, wherein the identification information includes one or more of:
   an antenna type;
   an antenna model number;
   an antenna serial number;
   a phase center model of the antenna; and
   a reference point of the antenna.

18. The method of claim 16, further comprising:
   determining, by the receiver-side radio, the identification information based on the identifying signal; and
   in response to receiving the identifying signal, sending, by the receiver-side radio via the wired connection, a confirmation signal indicating receipt of the identifying signal by the receiver-side radio.

* * * * *